(12) United States Patent
Aula et al.

(10) Patent No.: US 9,599,477 B1
(45) Date of Patent: Mar. 21, 2017

(54) SPECIFYING UNAVAILABLE LOCATIONS FOR AUTONOMOUS VEHICLES

(71) Applicant: Google Inc., Mountain View, CA (US)

(72) Inventors: Anne Kristiina Aula, Mountain View, CA (US); Brian Douglas Cullinane, Palo Alto, CA (US); Daniel Jules Switkin, Sunnyvale, CA (US); Jennifer Arden, San Francisco, CA (US); Renaud-Roland Hubert, Gilroy, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/840,515

(22) Filed: Aug. 31, 2015

Related U.S. Application Data

(63) Continuation of application No. 14/472,900, filed on Aug. 29, 2014.

(60) Provisional application No. 62/002,319, filed on May 23, 2014.

(51) Int. Cl.
   *G01C 21/00* (2006.01)
   *G01C 21/26* (2006.01)
   *G01C 21/36* (2006.01)

(52) U.S. Cl.
   CPC .......... *G01C 21/26* (2013.01); *G01C 21/3667* (2013.01)

(58) Field of Classification Search
   CPC ...................................................... G01C 21/20
   USPC ......................................................... 701/409
   See application file for complete search history.

(56) References Cited

U.S. PATENT DOCUMENTS

| | | |
|---|---|---|
| 4,361,202 A | 11/1982 | Minovitch |
| 4,465,155 A | 8/1984 | Collins |
| 5,293,160 A | 3/1994 | Kurozu et al. |
| 5,367,456 A | 11/1994 | Summerville et al. |

(Continued)

FOREIGN PATENT DOCUMENTS

| | | |
|---|---|---|
| EP | 2573720 A1 | 3/2013 |
| EP | 2629269 A1 | 8/2013 |

(Continued)

OTHER PUBLICATIONS

Fagnant et al., "The travel and environmental implications of shared autonomous vehicles, using agent-based model scenarios", Transportation Research Part C, vol. 40 (2014): 1-13.

(Continued)

*Primary Examiner* — Muhammad Shafi
(74) *Attorney, Agent, or Firm* — Lerner, David, Littenberg, Krumholz & Mentlik, LLP

(57) ABSTRACT

Aspects of the present disclosure relate to a vehicle for maneuvering a passenger to a destination autonomously. The vehicle includes one or more computing devices that receive a request for a vehicle from a client computing device. The request identifies a first location. The one or more computing devices also determine whether the first location is within a threshold outside of a service area of the vehicle. When the location is within the threshold distance outside of the service area of the vehicle, the one or more computing devices identify a second location within the service area of the vehicle where the vehicle is able to stop for a passenger and based on the first location. The one or more computing devices then provide a map and a marker identifying the position of the second location on the map for display on the client computing device.

20 Claims, 18 Drawing Sheets

(56) References Cited

U.S. PATENT DOCUMENTS

| | | | |
|---|---|---|---|
| 5,640,323 | A | 6/1997 | Kleimenhagen et al. |
| 6,236,333 | B1 | 5/2001 | King |
| 6,298,304 | B1 | 10/2001 | Theimer |
| 6,591,172 | B2 | 7/2003 | Oda et al. |
| 6,963,794 | B2 | 11/2005 | Geber et al. |
| 7,113,864 | B2 | 9/2006 | Smith et al. |
| 7,859,386 | B2 | 12/2010 | Lundkvist |
| 7,928,829 | B2 | 4/2011 | Hermann |
| 8,044,771 | B2 | 10/2011 | Nakajima et al. |
| 8,126,450 | B2 | 2/2012 | Howarter et al. |
| 8,352,112 | B2 | 1/2013 | Mudalige |
| 8,494,765 | B2 | 7/2013 | Konet et al. |
| 8,532,862 | B2 | 9/2013 | Neff |
| 8,676,430 | B1 | 3/2014 | Ferguson et al. |
| 8,688,306 | B1 | 4/2014 | Nemec et al. |
| 8,718,861 | B1 | 5/2014 | Montemerlo et al. |
| 8,736,438 | B1 | 5/2014 | Vasquez et al. |
| 8,768,565 | B2 | 7/2014 | Jefferies et al. |
| 8,880,270 | B1 | 11/2014 | Ferguson et al. |
| 8,935,034 | B1 | 1/2015 | Zhu et al. |
| 9,060,003 | B2 | 6/2015 | Wang et al. |
| 2004/0036622 | A1* | 2/2004 | Dukach .......... G06Q 30/02 340/691.6 |
| 2004/0260470 | A1 | 12/2004 | Rast |
| 2007/0073472 | A1 | 3/2007 | Odinak et al. |
| 2007/0073552 | A1 | 3/2007 | Hileman |
| 2008/0061931 | A1 | 3/2008 | Hermann |
| 2008/0136674 | A1 | 6/2008 | Jang et al. |
| 2008/0195428 | A1 | 8/2008 | O'Sullivan |
| 2008/0266139 | A1 | 10/2008 | Kim |
| 2009/0171566 | A1 | 7/2009 | Morimoto et al. |
| 2009/0216600 | A1 | 8/2009 | Hill |
| 2009/0287367 | A1 | 11/2009 | Salinger |
| 2010/0007525 | A1 | 1/2010 | Shanbhag et al. |
| 2010/0017084 | A1 | 1/2010 | Riegel |
| 2010/0070168 | A1 | 3/2010 | Sumcad et al. |
| 2010/0075656 | A1 | 3/2010 | Howarter et al. |
| 2010/0117585 | A1 | 5/2010 | Fitch et al. |
| 2010/0256836 | A1 | 10/2010 | Mudalige |
| 2010/0284771 | A1 | 11/2010 | Stierler |
| 2010/0286845 | A1 | 11/2010 | Rekow et al. |
| 2011/0099040 | A1* | 4/2011 | Felt .......... G06F 17/3087 705/7.12 |
| 2011/0112969 | A1 | 5/2011 | Zaid et al. |
| 2011/0144865 | A1 | 6/2011 | Niemz |
| 2011/0144980 | A1* | 6/2011 | Rysenga .......... G06Q 10/109 704/201 |
| 2011/0191019 | A1 | 8/2011 | Holsinger et al. |
| 2011/0301985 | A1 | 12/2011 | Camp et al. |
| 2012/0041675 | A1 | 2/2012 | Juliver et al. |
| 2012/0072051 | A1 | 3/2012 | Koon et al. |
| 2012/0083960 | A1 | 4/2012 | Zhu et al. |
| 2012/0173080 | A1 | 7/2012 | Cluff |
| 2012/0188100 | A1 | 7/2012 | Min et al. |
| 2012/0271500 | A1 | 10/2012 | Tsimhoni et al. |
| 2013/0024049 | A1 | 1/2013 | Yoshioka et al. |
| 2013/0231824 | A1 | 9/2013 | Wilson et al. |
| 2013/0289825 | A1 | 10/2013 | Noh et al. |
| 2013/0321178 | A1 | 12/2013 | Jameel et al. |
| 2014/0135598 | A1 | 5/2014 | Weidl et al. |
| 2014/0156182 | A1 | 6/2014 | Nemec et al. |
| 2014/0172727 | A1 | 6/2014 | Abhyanker et al. |
| 2014/0189096 | A1 | 7/2014 | Miller et al. |
| 2014/0365250 | A1 | 12/2014 | Ikeda et al. |
| 2014/0380424 | A1 | 12/2014 | Thompson |
| 2015/0073645 | A1 | 3/2015 | Davidsson et al. |
| 2015/0127191 | A1 | 5/2015 | Misra et al. |
| 2015/0148989 | A1 | 5/2015 | Cooper et al. |
| 2015/0149320 | A1 | 5/2015 | Smirin |
| 2015/0185034 | A1 | 7/2015 | Abhyanker |
| 2015/0219464 | A1 | 8/2015 | Beaurepaire et al. |
| 2015/0321641 | A1 | 11/2015 | Abou Mahmoud et al. |
| 2015/0324708 | A1 | 11/2015 | Skipp et al. |
| 2015/0334187 | A1* | 11/2015 | Pesola .......... H04L 51/18 715/752 |
| 2015/0338849 | A1 | 11/2015 | Nemec et al. |
| 2015/0339928 | A1 | 11/2015 | Ramanujam |
| 2015/0369621 | A1 | 12/2015 | Abhyanker |
| 2015/0370251 | A1 | 12/2015 | Siegel et al. |
| 2016/0019790 | A1 | 1/2016 | Tobolski et al. |
| 2016/0027307 | A1 | 1/2016 | Abhyanker et al. |
| 2016/0116293 | A1 | 4/2016 | Grover et al. |
| 2016/0125735 | A1 | 5/2016 | Tuukkanen |
| 2016/0203377 | A1 | 7/2016 | Irie et al. |

FOREIGN PATENT DOCUMENTS

| | | |
|---|---|---|
| JP | 2001234653 A | 8/2001 |
| WO | 03080391 A2 | 10/2003 |

OTHER PUBLICATIONS

McFadden, Colin-Druce, "Autonomous car concept swaps steering wheel for gesture controls", <http://www.dvice.com/2014-3-12/autonomous-car-concept-swaps-steering-wheel-gesture-controls>, Mar. 12, 2014.

Ridden, Paul, "ATNMBL—The concept car with no steering wheel, brake pedal or driver's seat", <http://www.gizmag.com/atnmbl-autonomous-concept-passenger-transport/15877/>, Jul. 29, 2010.

Ranoa, "Infographic: The car that drives itself", Los Angeles Times, copyright 2014,<http://www.latimes.com/la-sci-g-google-self-driving-car-20140528-htmlstory.html>.

McKeegan, "Autonomous taxi can be hailed with and iPad app", Oct. 14, 2010, downloaded from <http://www.gizmag.com/autonomous-taxi-ipad/16649/>.

Baydere et al., "MR 302: The Future of the Automobile: Car-Sharing Service using Autonomous Automobiles" Spring 2014.

Bluetooth® Keyless, "FAQs about the Bluetooth® Passive Keyless Entry Module", copyright 2014, downloaded from <http://bluetoothkeyless.info/bluetooth-keyless-information/>.

Chevrolet, "OnStar Remote Link™: Control you Chevy even when you're not driving", 2014 downloaded from <http://www.chevrolet.com/onstar-remotelink.html>.

Goodwin, "Add-on module auto-unlocks your car when your phone is near", clnet, Nov. 19, 2013, downloaded from <http://www.cnet.com/news/add-on-module-auto-unlocks-your-car-when-your-phone-is-near/>.

International Search Report and Written Opinion for Application No. PCT/US2015/032181 dated Sep. 4, 2015.

U.S. Appl. No. 61/391,271, filed Oct. 8, 2010, 63 pgs.

Junqing Wei et al., "Towards a viable autonomous driving research platform", In: Intelligent Vehicles Symposium (IV), 2013 IEEE, Jun. 23-26, 2013, pp. 763-770.

International Search Report and Written Opinion for Application No. PCT/US2015/032171 dated Sep. 17, 2015.

\* cited by examiner

1400

SPECIFYING UNAVAILABLE LOCATIONS FOR AUTONOMOUS VEHICLES

CROSS REFERENCE TO RELATED APPLICATIONS

The present application is a continuation of U.S. patent application Ser. No. 14/472,900, filed Aug. 29, 2014, which claims the benefit of the filing date of U.S. Provisional Patent Application No. 62/002,319 filed May 23, 2014, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a method. The method includes receiving, by one or more computing devices, a request for a vehicle from a client computing device. The request identifies a first location. The method also includes determining, by the one or more computing devices, whether the first location is within a threshold distance outside of a service area of the vehicle. When the location is within the threshold distance outside of the service area of the vehicle, the method includes identifying, by the one or more computing devices, a second location within the service area of the vehicle where the vehicle is able to stop for a passenger and based on the first location. The method also includes providing, by the one or more computing devices, a map and a marker identifying the position of the second location on the map for display on the client computing device.

In one example, the method also includes providing for display with the map and the marker, a street level image corresponding to the second location and a second marker identifying an area around the second location corresponding to a likely location that the vehicle will stop for the passenger. In this example, the method also includes receiving user input indicating that the map marker has been moved to a different position on the map, identifying a third location based on the user input, and providing a second street level image for display with the map. In this example, the method also includes receiving user input confirming the third location and dispatching the vehicle to the third location to pick up a user. In another example, the method also includes receiving user input confirming the second location and dispatching the vehicle to the second location to pick up a user. In another example, the method also includes providing for display on the client computing device navigation directions between the first location and the second location. In another example, the second location is a destination location of the vehicle, and the method also providing the second location to the vehicle as a destination location for a passenger.

Another aspect of the disclosure provides a system. The system includes one or more computing devices that are receive a request for a vehicle from a client computing device. The request identifies a first location. The one or more computing devices are also configured to determine whether the first location is within a threshold distance outside of a service area of the vehicle and when the location is within the threshold distance outside of the service area of the vehicle, identify a second location within the service area of the vehicle where the vehicle is able to stop for a passenger based on the first location. The one or more computing devices are also configured to provide a map and a marker identifying the position of the second location on the map for display on the client computing device.

In one example, the one or more computing devices are also configured to provide for display with the map and the marker a street level image corresponding to the second location and a second marker identifying an area around the second location corresponding to a likely location that the vehicle will stop for the passenger. In this example, the one or more computing devices are also configured to receive user input indicating that the map marker has been moved to a different position on the map, identify a third location based on the user input, and provide a second street level image for display with the map. In this example, the one or more computing devices are also configured to receive user input confirming the third location and dispatch the vehicle to the third location to pick up a user. In another example, the one or more computing devices are also configured to receive user input confirming the second location and dispatch the vehicle to the second location to pick up a user. In another example, the one or more computing devices are further configured to provide for display on the client computing device navigation directions between the first location and the second location. In another example, the second location is a destination location of the vehicle, and the one or more computing devices are also configured to provide the second location to the vehicle as a destination location for a passenger.

A further aspect of the disclosure provides a non-transitory, tangible machine readable medium on which instructions are stored. The instructions, when executed by one or more processors, cause the one or more processors to perform a method. The method includes receiving, by one or more computing devices, a request for a vehicle from a client computing device. The request identifies a first location. The method also includes determining, by the one or more computing devices, whether the first location is within a threshold distance outside of a service area of the vehicle. When the location is within the threshold distance outside of the service area of the vehicle, the method includes identifying, by the one or more computing devices, a second location within the service area of the vehicle where the vehicle is able to stop for a passenger and based on the first location. The method also includes providing, by the one or more computing devices, a map and a marker identifying the position of the second location on the map for display on the client computing device.

In one example, the method also includes providing for display with the map and the marker, a street level image corresponding to the second location and a second marker identifying an area around the second location corresponding to a likely location that the vehicle will stop for the passenger. In this example, the method also includes receiving user input indicating that the map marker has been moved to a different position on the map, identifying a third location based on the user input, and providing a second street level image for display with the map. In this example, the method also includes receiving user input confirming the third location and dispatching the vehicle to the third location to pick up a user. In another example, the method also includes receiving user input confirming the second location and dispatching the vehicle to the second location to pick up a user. In another example, the method also includes providing for display on the client computing device navigation directions between the first location and the second location. In another example, the second location is a destination location of the vehicle, and the method also providing the second location to the vehicle as a destination location for a passenger.

DETAILED DESCRIPTION

Overview

Figure 1:
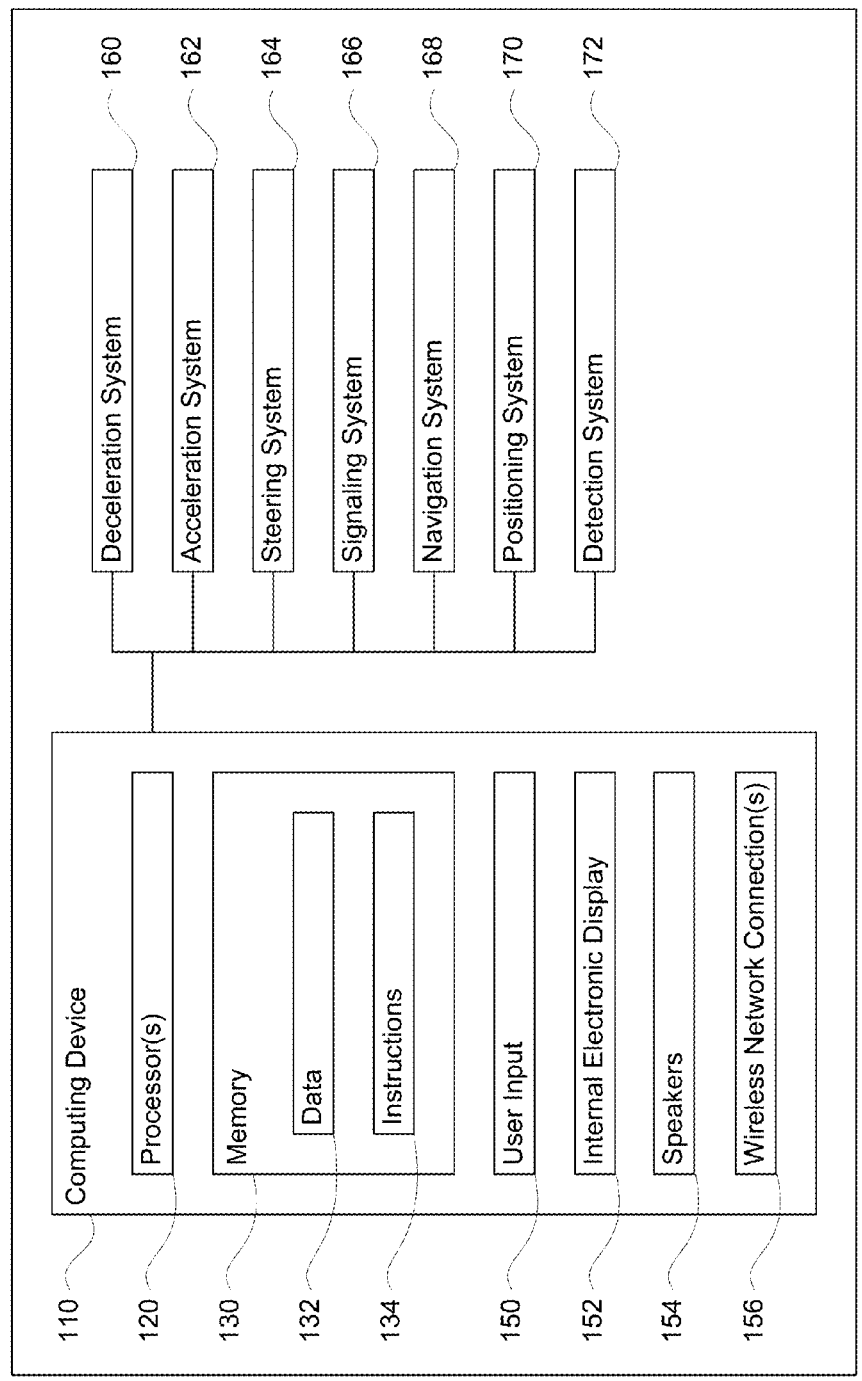
FIG. 1 is a functional diagram of an example vehicle in accordance with an exemplary embodiment.

The technology relates to autonomous vehicle for maneuvering a user or passenger to a destination, for example taking a trip, autonomously. In order to do so, the user may provide a pickup location and a destination location for the trip to a centralized dispatching system via a client computing device, such as a mobile phone. However, in some cases, these pickup or destination locations may be outside of a service area of the autonomous vehicle. Rather than simply denying the use the ability to use the services of the autonomous vehicles, the user may be provided with a proposed alternative pickup or destination location as well as other information, such as that the location is too far away and the service is not available, in order to better serve the user.

Pickup and destination locations may be identified in various ways. As an example, the pick location can be defaulted to current location of the user's client computing device, but may also be a recent or saved location near the current location associated with the user's account. As another example, locations may be suggested to a user based on the user's history with the service. The user may also enter an address or other location information, tap a location on a map, or select a location from a list in order to identify a pickup and/or destination location.

Although the user may enter a discrete location such as an address or point on a map as described above, this location may be converted into or displayed with or as a pickup "area" encompassing a zone in which the user can expect the vehicle to stop to pick up the user. This may provide a more relevant understanding of where the pickup is likely to occur as the actual pickup location will depend upon changing factors such as parking availability, other vehicles or obstructions, etc.

The user may also be able to fine tune this pickup location. For example, once a pickup location has been identified, the user may be provided with a street level image of the pickup location and/or a map that includes the pickup location and immediately surrounding areas. The map may also include aerial imagery in order to provide the user with greater context. The user may be able to edit the exact pickup location by moving a marker on the map. At the same time that the map marker is moved, a new street level image corresponding to the new map marker location may replace the display of the original street level image. When the user is satisfied, he or she may confirm the pickup location and an autonomous vehicle may be dispatched to the confirmed location. Again, the pickup location may also be displayed as an area around the identified pickup location. As such, moving the map marker to a new map marker location may cause the area of the pickup location to change as well.

When the pickup location is outside of the service area, the centralized dispatching system may determine whether the pickup location within a threshold distance of an acceptable pickup location within the service area. If so, the user may be provided with an option to receive a revised pickup location or area within the service area that is closest, more convenient, or otherwise relevant to the original pickup location or based on the user's current location. The user may also be provided with a map and directions for navigating, for example walking directions or directions for using public transportation, to the revised pickup location or area. The user may then confirm (e.g., accept) or reject this revised pickup location. In some examples, the user may be able to fine tune this revised pickup location as described above. Again, when the user is satisfied, he or she may confirm the pickup location or area and an autonomous vehicle may be dispatched to the confirmed location.

When pickup location is outside the threshold, the user may be notified that the pickup location is outside of the service area. In this example, the user may be provided with an informational message listing the geographic areas within the service area. The user may also have an opportunity to select or identify another pickup location. In some examples, the application may also provide the user with instructions for reaching a pickup location or area within the service area using a different type of transportation such as a bus, train, or other public transportation.

When an identified destination location is outside of the service area, the features described above with regard to a pickup location may be used to provide a revised destination location or area (as with the pickup locations and areas described above). As with the pickup example, the user may also be provided with the ability to fine tune a destination location or area, revised destination location or area, or a closest, more convenient, or otherwise relevant acceptable destination location or area using the features described above. Once the destination is confirmed, the user may also be able to specify additional (second, third, etc.) destinations. Again, when a destination location is outside of the service area, the features described above with regard to a pickup location may be used to provide a revised destination location or area.

The features described herein provide for an increase in the availability of the services of autonomous vehicles to users who request pickup or destination locations that are outside of the service area by providing them with alternative pickup locations. Also, users will be provided with realistic expectations for where the vehicle can and cannot go at the outset of a trip. In addition, by allowing a user to fine tune the pickup and destination locations, the user may have a higher confidence that he or she will be picked up or dropped on in their desired location and also in the autonomous vehicle generally.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computer 110 may use the positioning system 170 to determine the vehicle's location and detection system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

Figure 2:
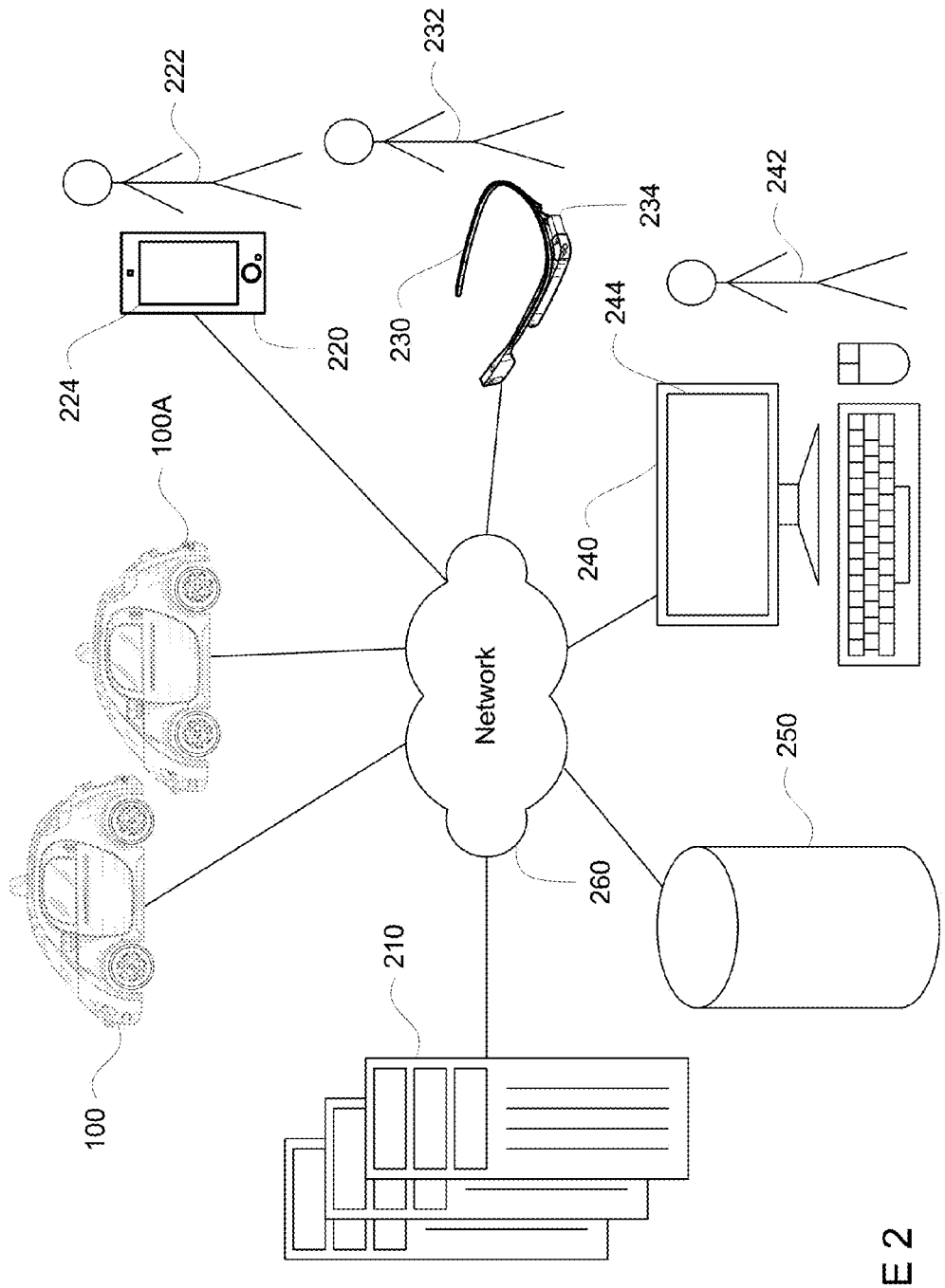
FIG. 2 is a functional diagram of an example system in accordance with an exemplary embodiment.
Figure 3:
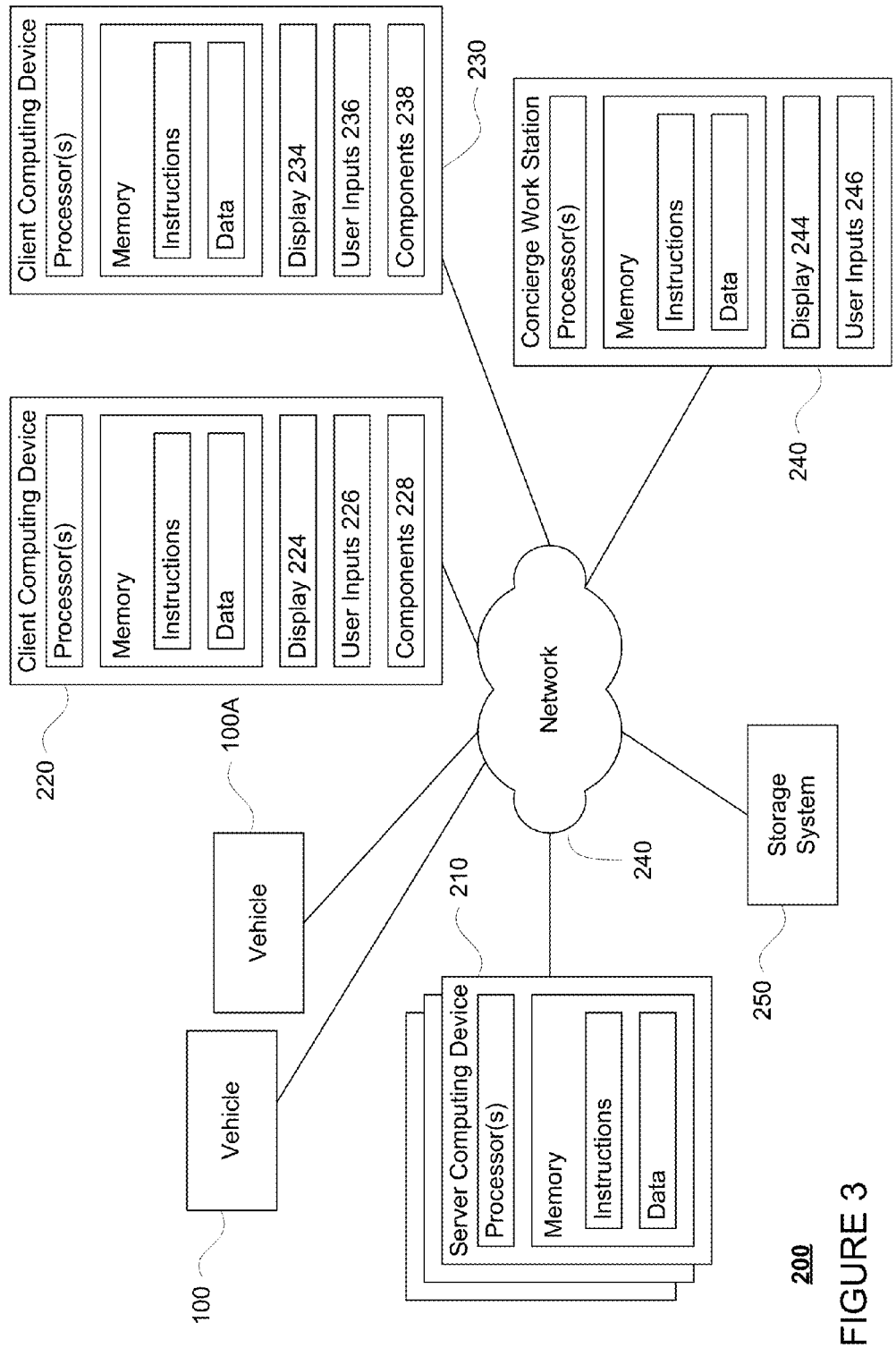
FIG. 3 is a pictorial diagram of the system of FIG. 2 in accordance with aspects of the disclosure.
Figure 4A:
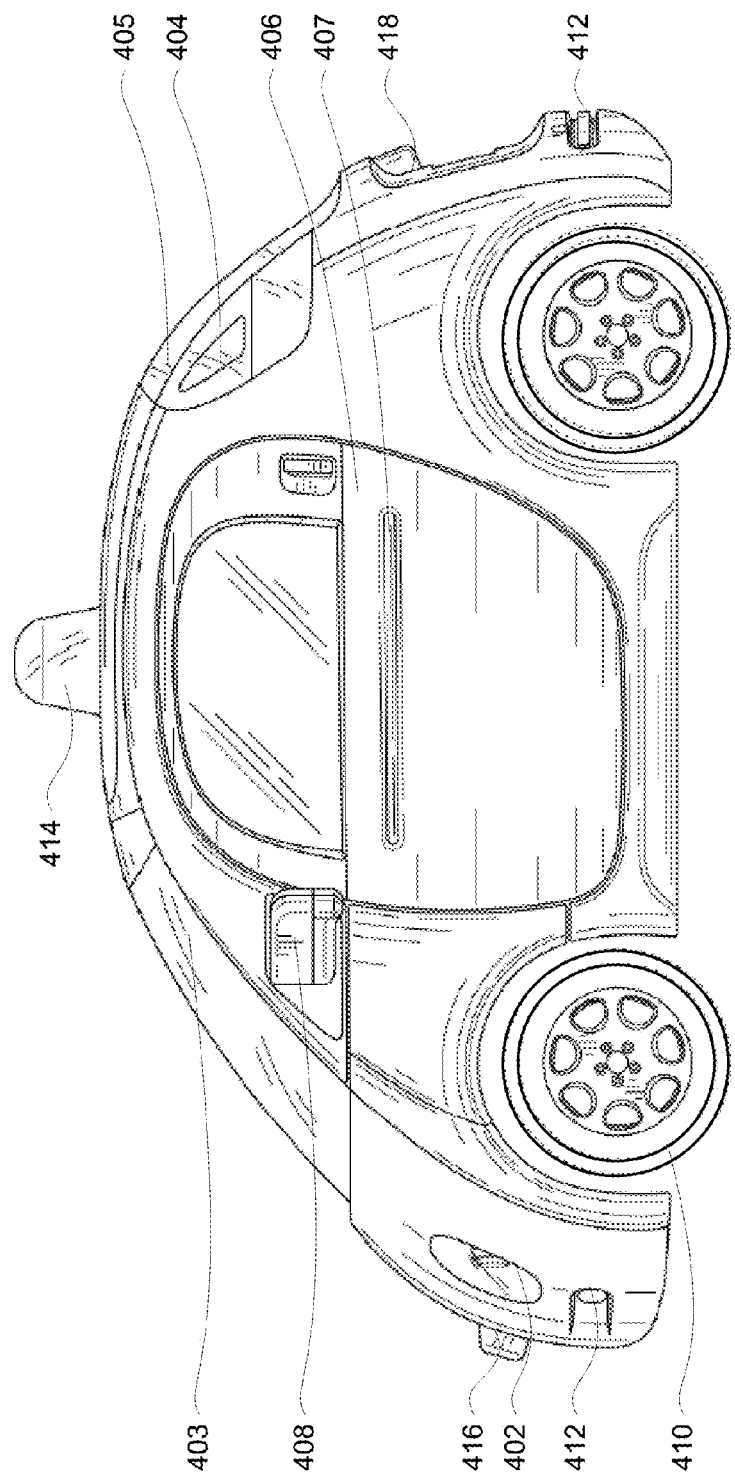
FIGS. 4A-4D are example external views of a vehicle in accordance with aspects of the disclosure.
Figure 4C:
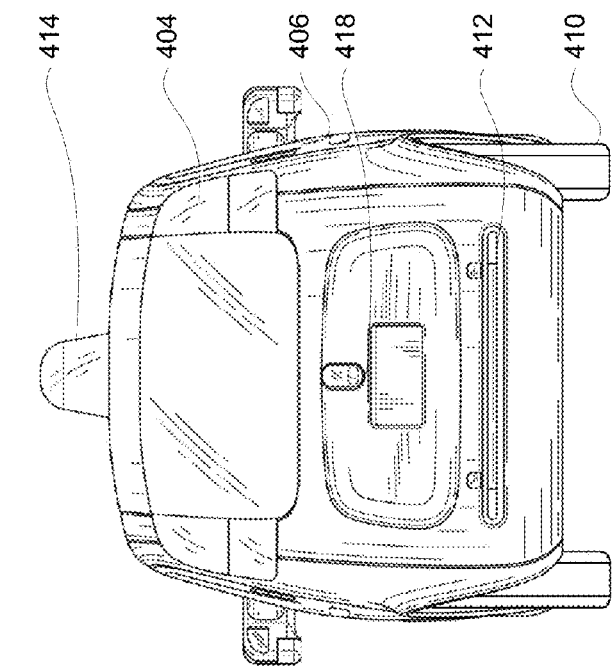
Figure 4B:
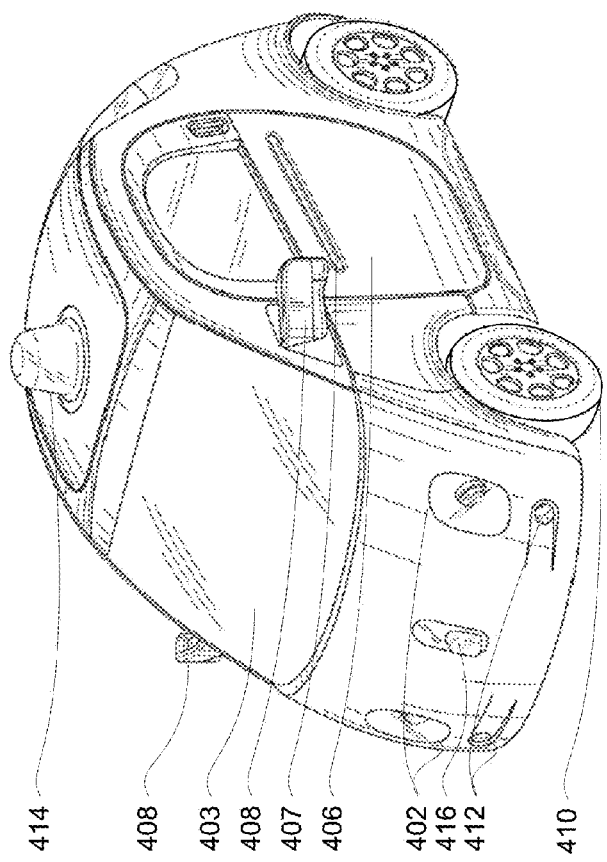
Figure 4D:
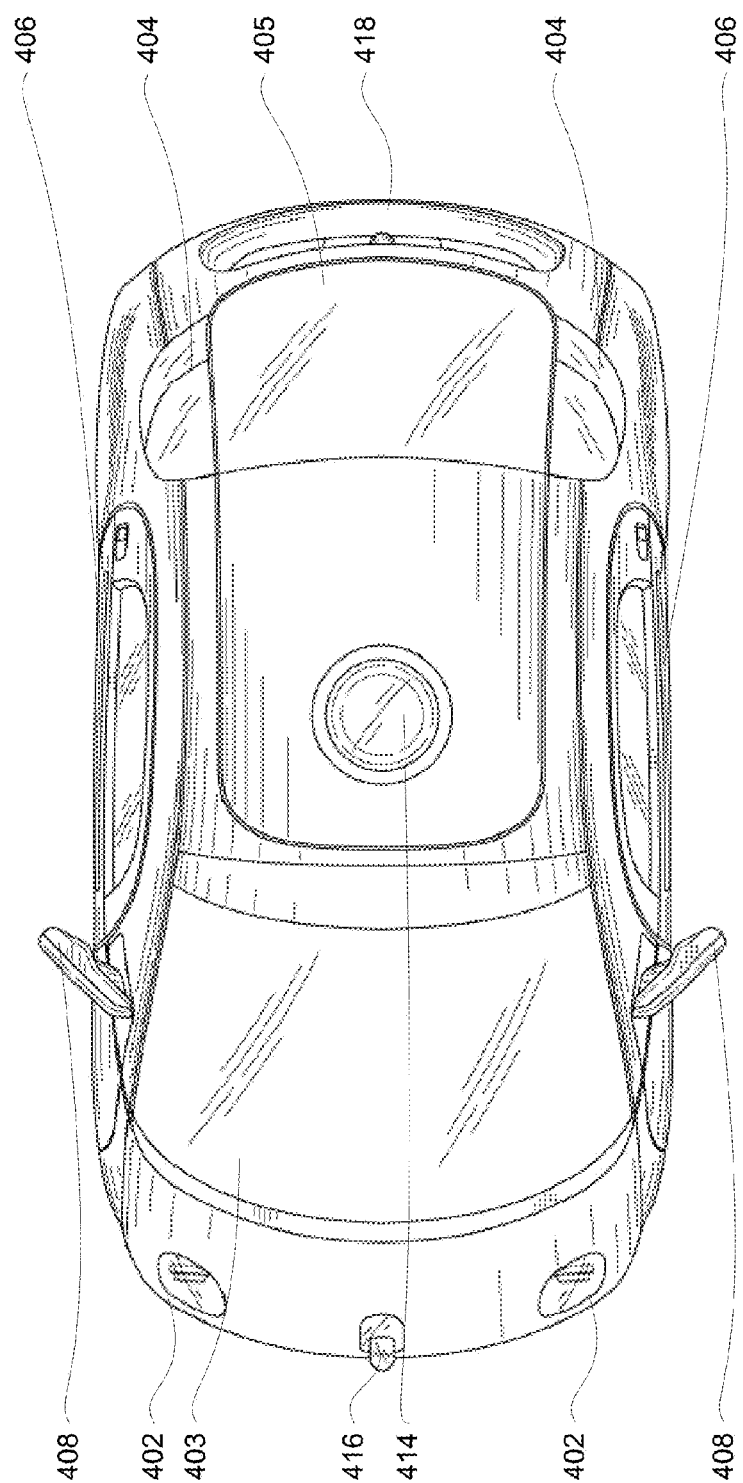

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch-screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Figure 5:
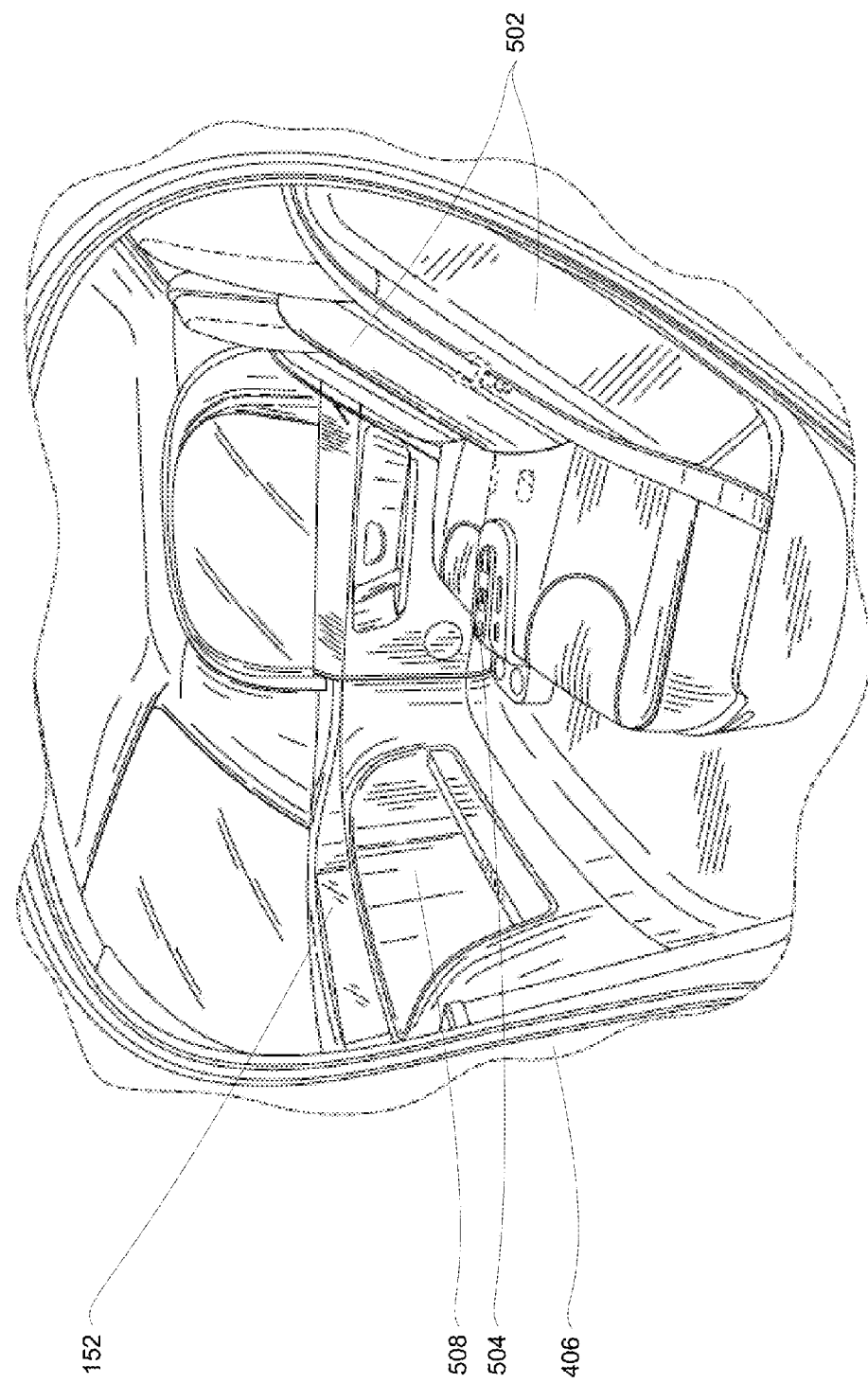
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

The internal electronic display 152 has a generally rectangular shape where the width (or vertical height dimension) of the display is significantly smaller than the length (or horizontal dimension). The internal electronic display 152 may include an anti-reflective coating and be situated above the storage bin area 508 in order to align with a passenger's eye level when seated in either of the seats 502. The microphone of the user input 150 may be a located behind a small opening at the top center of the internal electronic display 152.

Storage bin area 508 may be configured to hold items such as shopping bags, purses, backpacks, etc. The depth of the storage bin may be configured such that larger objects are less likely to tip out of the storage bin area during an abrupt deceleration or acceleration of vehicle 100. In some examples, elastic straps may be used to further secure items in the storage bin area. Storage bin area 508 may serve a dual purpose as a foot rest for passengers seated in seats 502.

Figure 6:
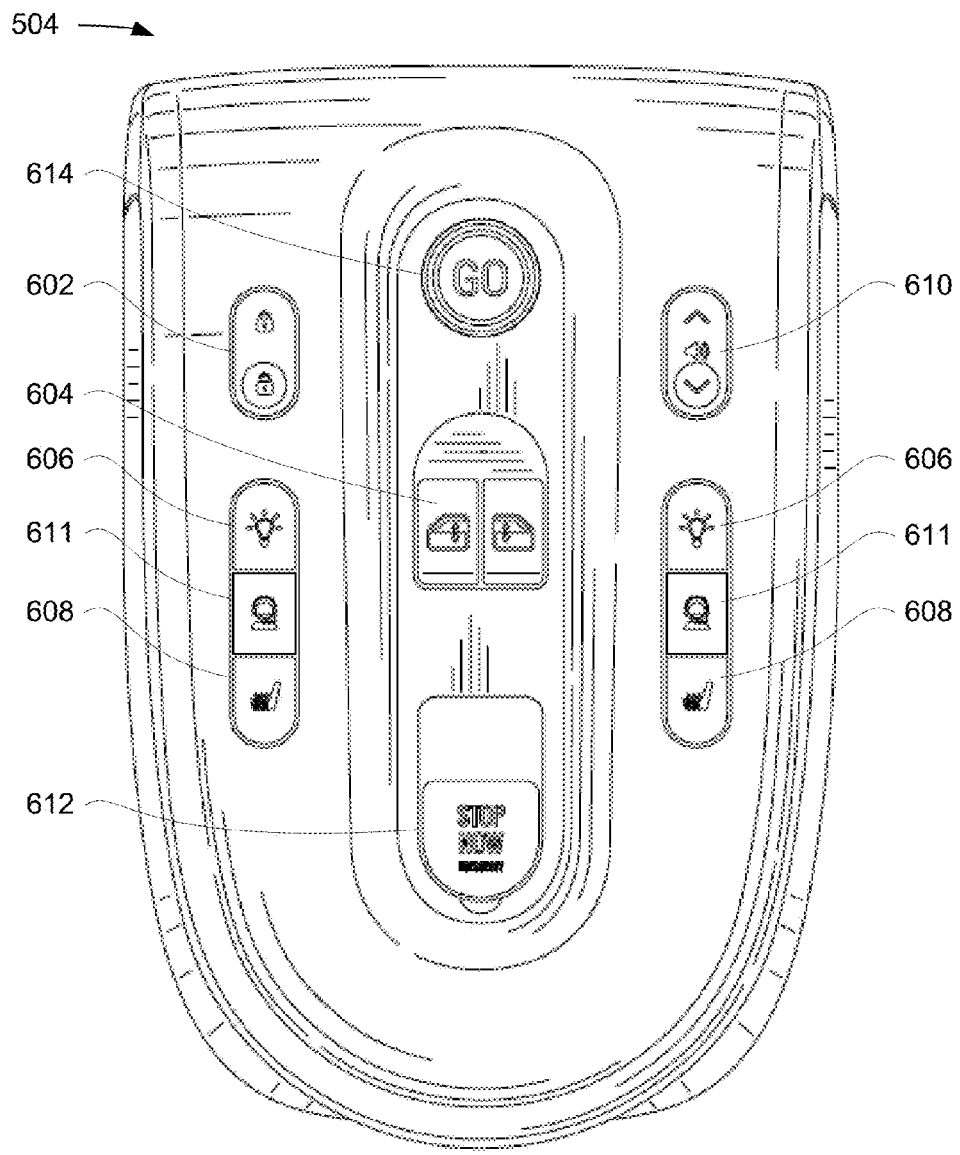
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computer 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency. In addition, because of the potentially abrupt nature of a stop initiated by the emergency stopping button 612, the emergency stopping button 612 may feature a cover (e.g., a clear plastic cover) that may have to be removed or flipped up in order to activate button 612.

Button 614 may be a multi-function button having different states. In the first state, button 614 may be a "GO" button which a passenger uses to initiate a trip to a destination. Once vehicle 100 is moving, button 614 may change to a "PULL OVER" button which a passenger users to initiate a non-emergency stop. In this regard, computer 110 may respond by determining a safe place to pull the vehicle over, rather than coming to a more sudden stop as with the emergency stop button 612. Alternatively, two buttons, one having a "GO" state and the other having a "PULL OVER" state may be used.

Thus, passenger communication with computer 110 for navigation purposes may be limited to button 614 (or two buttons as in the example above), emergency stopping button 612, wireless network connection 156 (such as Bluetooth LE) with the passenger's client computing device, and by sending information from the passenger's client computing device to the server 210 which then relays that information to the vehicle's computer. In some examples, a passenger may provide information to the vehicle's computer 110 via voice commands though the microphone as discussed above. In addition, however, the passenger may communicate with the concierge via a phone call, an application on the passenger's client computing device, a microphone, and/or the concierge button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

Figure 7:
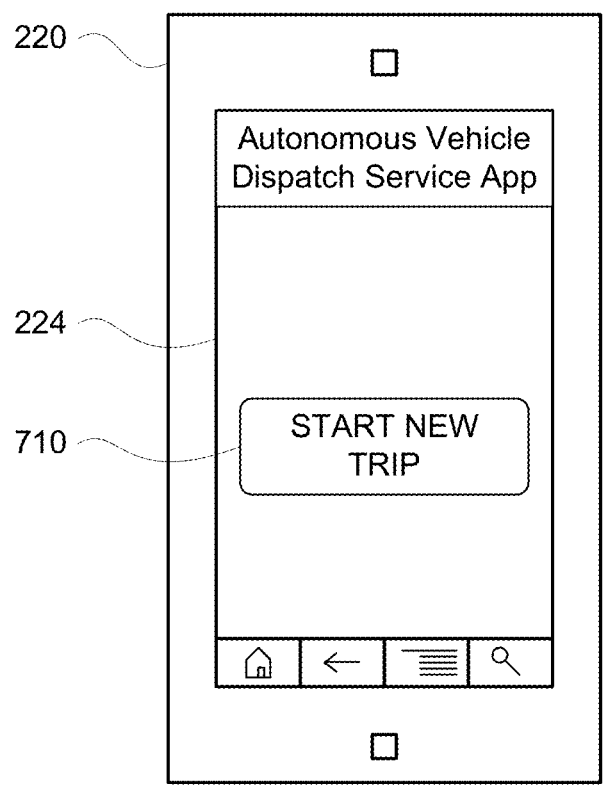
FIG. 7 is an example screen shot display and a client computing device in accordance with aspects of the disclosure.

The user may then use his or her client computing device to access the application and request a vehicle. As an example, a user such as user 232 may use client computing device 230 to send a request to one or more server computing devices 210 for a vehicle. For example, as shown in FIG. 7, the application may display an option 710 to start a new trip on display 224 of client computing device 220. By selecting option 710, for example, using either a finger or stylus (if a touchscreen) or mouse pointer, the user may be provided with the opportunity to input, provide, or otherwise select a pickup location, a drop off location, and, in some cases, one or more intermediate stopping locations anywhere within a service area where a vehicle can stop.

These pickup and destination locations may be predefined (e.g., specific areas of a parking lot, etc.) or may simply be any location within a service area of the vehicles. The pickup location can be defaulted to current location of the user's client computing device, but may also be a recent or saved location near the current location associated with the user's account. For example, while a user may be located in a park, he or she may have a default location at one or another entrance to that park. As another example, locations may be suggested to a user based on the user's history with the service. Alternatively, the user may enter an address or other location information or tap a location on a map to select a pickup location. This may be especially helpful where the user is not currently located at the pickup location but will be by the time the vehicle arrives. In yet another example, a search function may be used to provide search results highlighting specific pickup locations within the service area of the vehicles.

Figure 8:
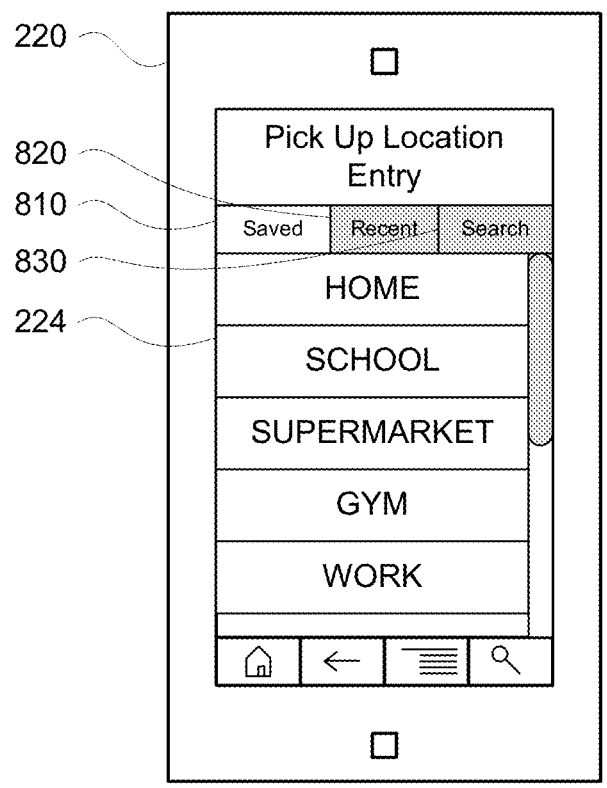
FIG. 8 is another example screen shot display and a client computing device in accordance with aspects of the disclosure.

FIG. 8 is an example of a pickup location entry display. In this example, display 224 includes a list of saved location 810 including the user's home, school, supermarket, gym, work, as well as other location not included on the display screen. The user may also select option 820 to review and select from a similar list of recent pick up locations. Similarly, the user may select option 830 to enter an address or other location information or tap a location on a map to select a pickup location or enter a query to receive search results highlighting specific pickup locations within the service area of the vehicles that relate to the search query.

In other examples, a user may automatically integrate vehicle requests into their daily calendar, through integrations with calendar systems such as those used with email systems. For instance, when creating a calendar entry, a user may select or check a box to "send a vehicle" to a certain location before or after the entry. This information may then be sent by the application or a remote server at an appropriate time to one or more server computing devices 210 in order to dispatch a vehicle for the user. Moreover, the application may automatically send a request for a vehicle when the application determines that two meetings are physically too far apart to walk between in the allotted time.

Once a pickup location has been identified, the user may be provided with a street level image of the pickup location and/or a map that includes the pickup location and immediately surrounding areas. For example, the identified pickup location may be sent to the server computing devices 210 which retrieve and provide the client computing device with map information for display to the user. As noted above, the server computing devices 210 may also provide the client computing device with a street level image corresponding to the location of identified pickup location.

Figure 9B:
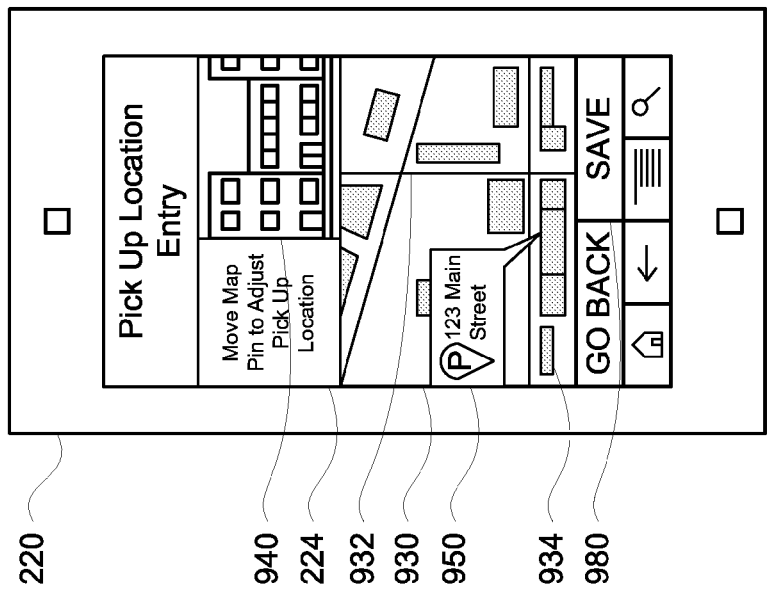
FIGS. 9A-9D are further example screen shot displays and client computing devices in accordance with aspects of the disclosure.
Figure 9A:
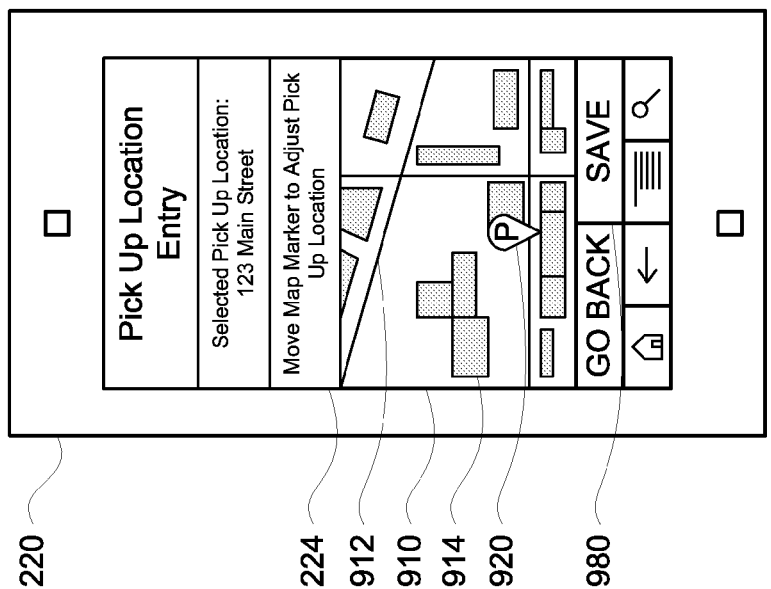

FIG. 9A is an example display of an identified pick up location P including a map 910. In this example, the pickup location P is indicated by a map marker 920 shown at its location on map 910. FIG. 9B is another example display of an identified pickup location P including a map 930 and a street level image 940. In this example map marker 950 includes information about the pickup location, here an address. Street level image 940 is an image that corresponds to the location (street address) of map marker 950. Both maps 910 and 930 include typical map features such as roads 912 and 932 as well as structures 914 and 934 corresponding to buildings to give the user context. Although not shown, the map may also include aerial imagery in order to provide the user with even greater context. Thus, various types of maps, location markers, and corresponding images may be used.

Figure 9D:
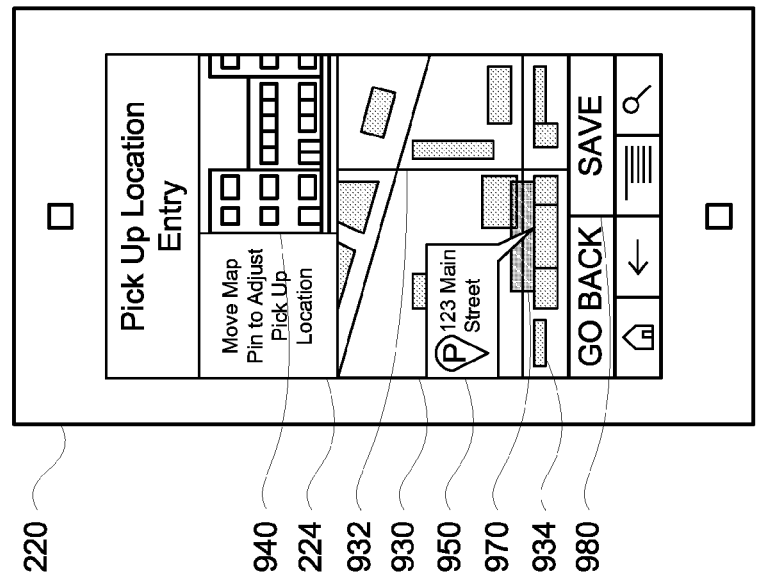
Figure 9C:
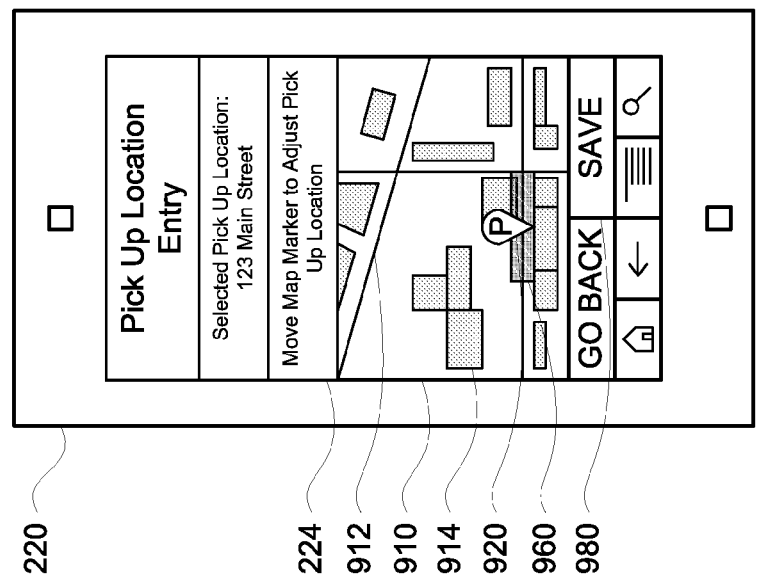

Again, as noted above, although the user may enter a discrete location such as an address or point on a map as described above, this location may be converted into or displayed with or as a pickup "area" encompassing a zone in which the user can expect the vehicle to stop to pick up the user. As an example, this zone may be a particular shape, such as a rectangle around the identified pickup location or distance along a road in which the identified pickup location is located. This may provide a more relevant understanding of where the pickup is likely to occur as the actual pickup location will depend upon changing factors such as parking availability, other vehicles or obstructions, etc. In this regard, FIG. 9C is an example display of an identified pick up location P corresponding to the example of FIG. 9A. However, in FIG. 9C, the pickup location P is indicated by map marker 920 shown at its location on map 910 along with a pickup location area 960. Similarly, FIG. 9D is an example display of an identified pick up location P corresponding to the example of FIG. 9B. However, in FIG. 9D, the pickup location P is indicated by map marker 950 shown at its location on map 930 along with a pickup location area 970. Although the examples of FIGS. 9C and 9D include map markers 920 and 950, such map markers need not also be displayed with the areas.

Figure 10A:
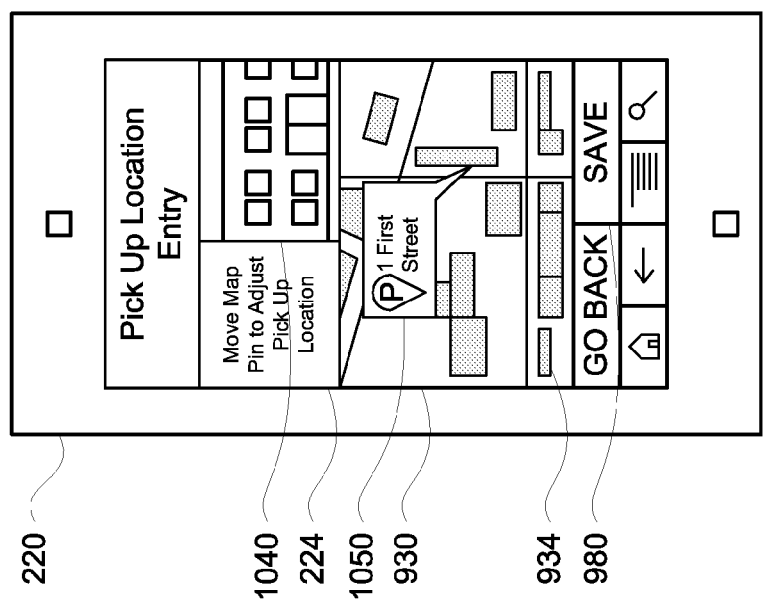
FIGS. 10A and 10B are further example screen shot displays and client computing devices in accordance with aspects of the disclosure.
Figure 10B:
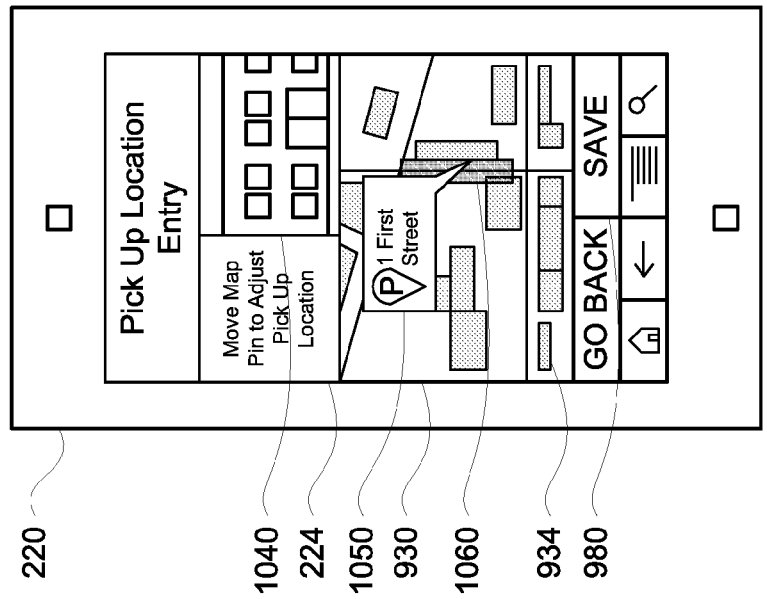

The user may also be able to fine tune this pickup location. The user may be able to edit the exact pickup location by moving a marker on the map. The new location of the map marker may be sent to the server computing devices 210 in order to provide the client computing device with updated information about the pickup location such as a new address and new map information. For example, the example displays of FIGS. 9A, 9B, 9C and 9D allow a user to move the map marker 920 or 950, respectively, to adjust the location of the pickup location P, such as by dragging a point on the display corresponding to the map marker to a new location on the map. FIG. 10A is an example where user has moved the location of map marker 950 (of FIG. 9B) to a new location corresponding to that of map marker 1050. FIG. 10B is an example where user has moved the location of map marker 950 (of FIG. 9D) to a new location corresponding to that of map marker 1050. However, in the example of FIG. 10B, the map marker 1050 is shown with a pickup location area 1060. Again, although the examples of FIG. 10B includes a map markers 1050, such a map marker need not also be displayed with the area. In addition, because the pickup location has been changed, the information about the pickup location in the map markers 1050 of FIGS. 10A and 10B, here an address, has also been changed.

At the same time that the map marker is moved, a new street level image corresponding to the new map marker location may replace the display of the original street level image. Again, in response to receiving the new location of the map marker, the server computing devices 210 in order to provide the client computing device with updated information about the pickup location such as a new address and new map information. For example, returning to FIG. 9B, street level image 940 corresponded to the address location of the map marker 950 or 123 Main Street. After being moved, as shown in FIG. 10, the address location of map marker 1050, 1 First Street, now corresponds to the location of street level image 1050.

When the user is satisfied, he or she may confirm the pickup location or area. This information may then be sent to the server computing devices 210. In response, the server computing devices 210 may dispatch an autonomous vehicle, such as vehicle 100, to the confirmed pickup location. For example, each of the examples of FIGS. 9A, 9B, 9C, 9D, 10A and 10B include a save option 980 that may allow a user to confirm the pickup location. In response to the selection of this option, the client computing device 220 may send the pickup location to the server computing devices 210. Alternatively, this information may be sent to the server computing devices 210 after it has been combined with additional information, such as one or more confirmed destination locations.

In some examples, the user may identify a pickup location that is outside the service area. When the server computing devices 210 determine that a pickup location received from a client computing device is outside the service area, the server computing devices may also determine by how much and compare this distance to a threshold distance. For example, if the pickup location within a threshold distance of the service area or some an acceptable pickup location within the service area the user may be provided with an option to receive a revised pickup location or area. As an example, this threshold distance may be five miles or more or less. This threshold distance may also be selected based on whether the user would be able to reach a pickup location within the service area within some reasonable amount of time because the user is too far away. This may also help to avoid the vehicle from having to wait for the user or the user being left without a pickup because the vehicle must leave the pickup location.

The revised pickup location or area may be identified by simply selecting a new location that is an acceptable pickup location to the original pickup location closest, more convenient, or otherwise relevant to the original pickup location. For example, if the closest pickup location is at a dangerous location (such as on a highway), a revised pickup location or area that is farther from the original pickup location in a less dangerous location may be selected.

The revised pickup location or area may also be selected based on other information about the user. For example, if it looks like a user may be riding a train because of the user's current location and speed, the server computing devices could determine the preferred pickup location to be the nearest train station within the service area (rather than the nearest point on the map). In this regard, the revised pickup location may be based on where the user can get to most easily given their current mode of transportation (e.g., walking, driving, riding a train, etc.).

Figure 11:
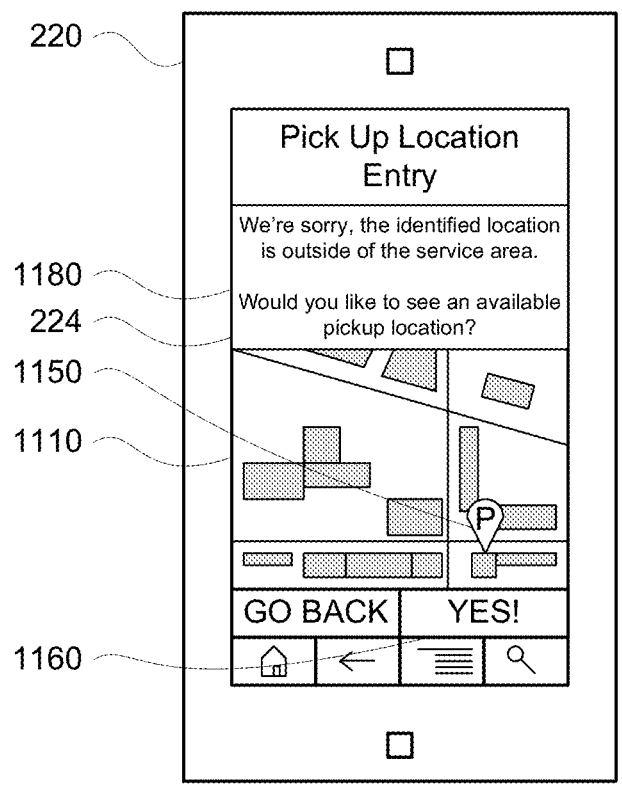
FIG. 11 is another example screen shot display and a client computing device in accordance with aspects of the disclosure.

In response to determining that pickup location is outside of the from the service area but within the threshold distance, the server computing devices may provide the client computing device with a notification to that effect. For example, FIG. 11 is an example display of a notification 1180 indicating that the identified pickup location is outside of the service area. In this example, the notification indicates that a revised pickup location P is available, here because the original identified pickup location O is within the threshold of an acceptable pickup location within the service area. Here, a map 1110 and map marker 1150 are also displayed to provide the user with context about the identified location. By selecting option 1160, the user may view additional information about the acceptable pickup location or the revised pickup location. Again, although the revised pickup location of FIG. 11 is shown as a discrete point P, as with the examples of FIGS. 9C and 9D, point P may also be associated with an area in which a pickup is likely to occur.

As another example, the notification may provide the user with an option to receive a revised pickup location. In response to selecting this option, the client computing device may request a revised pickup location from the server computing devices. The server computing devices may then select a revised pickup location and/or area as described above and send this information to the requesting client computing device. Once received, the client computing device's display may appear to "snap" the original pickup location to the revised pickup location or area by moving the map marker and/or area for the original pickup location or area to the revised pickup location or area.

Figure 12:
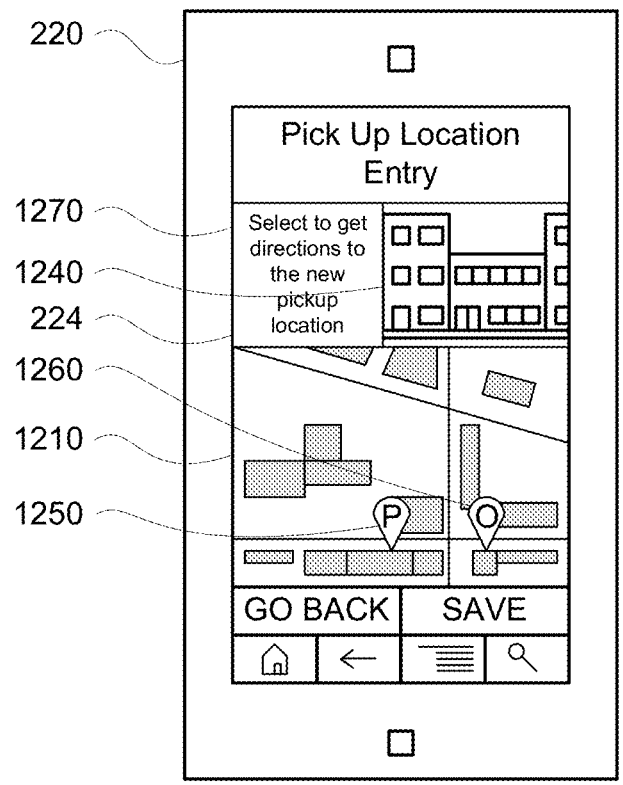
FIG. 12 is a further example screen shot display and a client computing device in accordance with aspects of the disclosure.

In this regard, server computing devices may also provide information identifying the revised pickup location to the client computing device. FIG. 12 is an example display of a revised pickup location. As with the examples described above, the client computing device may also be provided with map information including a map 1210 and map marker 1250 corresponding to the location of the revised pickup location, and in some cases, a street level image 1240 corresponding to the location of the revised pickup location. In this regard, FIGS. 9A, 9B, 9C, and 9D may also be considered example display of a revised pickup location. In the example of FIG. 12, the display also includes a map marker 1260 corresponding to the location of the original pickup location (see map marker 1150 of FIG. 11) to provide the user with additional context about the revised pickup location. Again, although the revised pickup location of FIG. 11 is shown with a discrete map marker, as with the examples of FIGS. 9C and 9D, the map marker may also be associated with an area in which a pickup is likely to occur.

In order to assist the user in reaching the revised pickup location or area, the client computing device may also be provided with directions for navigating to the revised pickup location or area by the server computing devices. In this regard, FIG. 12 also includes an option 1270 that if selected by the user will provide the user with directions for navigating between the location of map marker 1250 and the location of map marker 1260. Here because the distance between the revised pickup location P and the original identified pickup location O is within the first threshold distance, the directions for navigating may include walking directions. For larger distances, directions for using public transportation or even driving directions may be provided.

The user may then confirm (e.g., accept) or reject this revised pickup location or area. In some examples, the user may be able to fine tune this revised pickup location as described with regard to the examples of FIGS. 9A, 9B, 9C, 9D, 10A and 10B. Again, when the user is satisfied, he or she may confirm the revised pickup location, this information may be sent to the server computing devices, and an autonomous vehicle may be dispatched by the server computing devices to the confirmed location.

As with the examples described above, the user may also be provided with a map of the revised pickup location or area. The user may then confirm or reject this revised pickup location or area. In some examples, the user may be able to fine tune this revised pickup location as described above. When the user is satisfied, he or she may confirm the pickup location or area, this information may be sent to the server computing devices, and an autonomous vehicle may be dispatched to the confirmed location or area.

When pickup location is outside the threshold, the user may be notified that the pickup location is outside of the service area. In this example, the user may be provided with an informational message listing the geographic areas within the service area. The user may also have an opportunity to select another pickup location, for example by selecting an option to go back. By doing so, the user may be provided with another opportunity to identify a new pickup location. In some examples, the application may also provide the user with instructions for reaching a pickup location within the service area using a different type of transportation such as a bus, train, or other public transportation.

Figure 13:
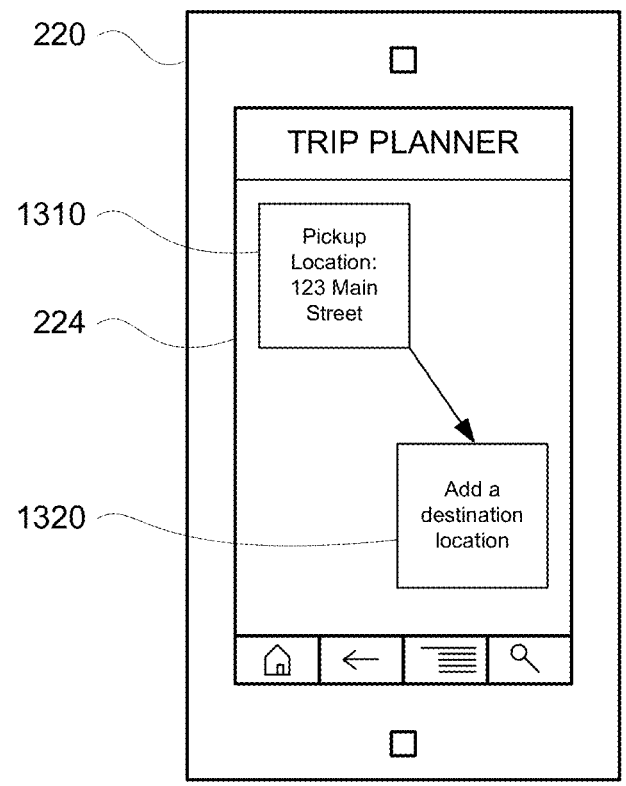
FIG. 13 is an example screen shot display and a client computing device in accordance with aspects of the disclosure.

As noted above, when the user is satisfied with the pickup location or area, the user may confirm the pickup location. This information may then be sent to the server computing devices 210. In response, the user may be provided with opportunity to identify one or more destination locations. For example, as shown in the example display of FIG. 13, the user may be provided with an option 1320 to add a destination location. In this example, selection option 1310, which identifies a confirmed pickup location, may allow the user to change the pickup location.

The destination locations may be identified using any of the examples described above with regard to pickup locations. The destination location may be displayed as with the examples of FIGS. 9A, 9B, 9C, and 9D with a map, map marker identifying the location of the destination location, and in some examples, a street level image corresponding to the location of the identified destination location. In that regard, user may be able to fine tune the destination location as described with regard to FIGS. 9B, 9D, 10A and 10B. Again as noted above, although the user may enter a discrete location such as an address or point on a map as described above, this location may be converted into or displayed with or as a pickup "area" encompassing a zone in which the user can expect the vehicle to drop off the user. This may provide a more relevant understanding of where the drop off is likely to occur as the actual drop off location will depend upon changing factors such as parking availability, other vehicles or obstructions, etc.

As with the examples of the pickup locations or areas, when the user is satisfied, he or she may confirm the destination location or area. This information may then be sent to the server computing devices 210 and relayed to the autonomous vehicle that was or will be dispatched to the pickup location.

When a destination location is outside of the service area, the features described above with regard to a pickup location may be used to provide a revised destination location. In this regard, the same thresholds may also be used to determine whether a revised destination location or area is available. In addition, as with the pickup example, the user may also be provided with the ability to receive a revised destination location or area and fine tune a revised destination location or area using the features described above.

Once the destination location or area is confirmed, the user may also be able to specify additional (second, third, etc.) destination locations. Again, when an additional destination location is outside of the service area, the features described above with regard to a pickup location may be used to determine whether a revised additional destination location is available, to provide a revised additional destination location and to fine tune the revised destination location or area.

When a vehicle arrives for a user, the computer 110 may attempt to authenticate the user. For example, using a wireless connection having a short range communication protocol such as Bluetooth LE, the computer 110 and the client computing device may communicate at some predetermined distance, such as 25 meters. Once the communication is established, for example, using one of the wireless network connections 156 the client computing device may be authenticated using any known authentication technique as an approximation or proxy for authenticating the user. In some cases, the authentication may occur even before the vehicle has reached the selected location if the vehicle passes by the user's client computing device and makes the wireless connection.

Once the user (and/or the user's client computing device) is authenticated to a sufficient degree and has reached a certain threshold distance from the vehicle 100, for example 10 meters or less, the doors 406 may automatically unlock, and in some cases open up, to allow the user to enter the vehicle.

Once the user (and/or the user's client computing device) has entered the vehicle, the computer 110 may display a welcome screen on the internal electronic display 152. This welcome screen may provide instructions to the user (now a passenger) on how to use the vehicle. For example, the instructions may include requesting that the passenger shut the doors 406 if needed and buckle his or her seatbelt. Sensors associated with the seats, doors, and seatbelts may be used to determine if the passenger has complied.

Once the passenger has complied with the instructions, the computer 110 may activate the button 614. In this regard, if the user does not close the door or buckle the seat belt, the computer 110 may not allow the passenger to use the vehicle for a trip. As noted above, when the passenger is ready to initiate a trip to the destination, he or she may press or otherwise activate button 614. In response, the computer 110 may initiate the necessary systems to control the vehicle autonomously to the destination (drop off location).

In some examples, the user can change the destination during certain portions of trip before the vehicle arrives at destination. The user can also add one or more additional stops (e.g., up to 2 destinations total) to a single trip, either during the request process or at another time before they release the vehicle. In the example above, where there are no inputs for the user to physically enter a destination at the vehicle, these destination changes or additions may be achieved by calling a concierge using the application on the client computing device or a telephone function of the client computing device or by entering the change using the application on the client computing device. Alternatively, where the user is able to enter a destination using a user input associated with internal electronic display 152, a change may be achieved by entering the new destination using such user input. Again, if the destination is outside of the service area, the server and/or application may inform the user via a notification on his or her client computing device and provide alternatives, if available, for reaching the destination as described above.

When the vehicle is within a certain distance in time or space (e.g., one mile or one minute), the computer 110 may display a notification to the user on the internal electronic display 152 that he or she is about to arrive at the destination. When the vehicle is ready to pull over, for example 25 meters or more or less before the destination location will be reached, the computer 110 may also display a notification on the internal electronic display 152 that the vehicle is attempting to pull over. In addition, when the vehicle is some distance from the destination, such as 25 meters or more or less from the destination, the computer 110 may begin to look for a place to pull over and stop. When the vehicle has pulled over, the computer 110 may display a notification to the user on the internal electronic display 152 that the vehicle has arrived. Similarly, a notification may also be provided to the user via the application on the client computing device. Once the vehicle is stopped, if the doors were previously locked during the trip, the doors may then unlock and, if not previously locked, simply open and allow the user to exit the vehicle.

Figure 14:
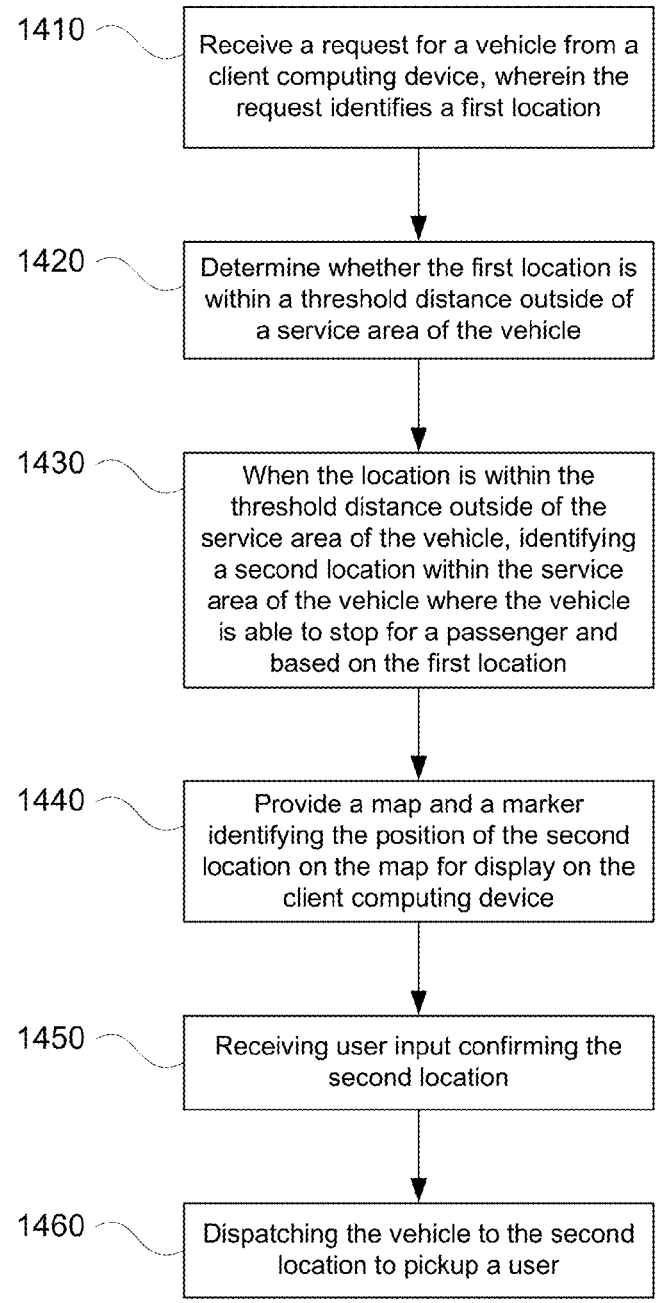
FIG. 14 is an example flow diagram in accordance with aspects of the disclosure.

FIG. 14 is an example flow diagram 1400 in accordance with some of the aspects described above that may be performed by one or more computing devices such as server computing devices 110. In this example, a request for a vehicle is received from a client computing device at block 1410. This request identifies a first location. Whether the first location is within a threshold distance outside of a service area of the vehicle is determined at block 1420. When the location is within the threshold distance outside of the service area of the vehicle, a second location within the service area of the vehicle where the vehicle is able to stop for a passenger and based on the first location is identified at block 1430. A map and a marker identifying the position of the second location on the map are provided for display on the client computing device at block 1440. User input confirming the second location is received at block 1450. The vehicle is the dispatched to the second location to pickup a user at block 1460.

In the example of flow diagram 1400, the first location and second locations correspond to pickup locations. However, if these locations were to refer to destination locations, rather than being dispatched to the second location to pickup a user at block 1460, the second location may be provided to the vehicle as a destination location for the user.

Figure 15:
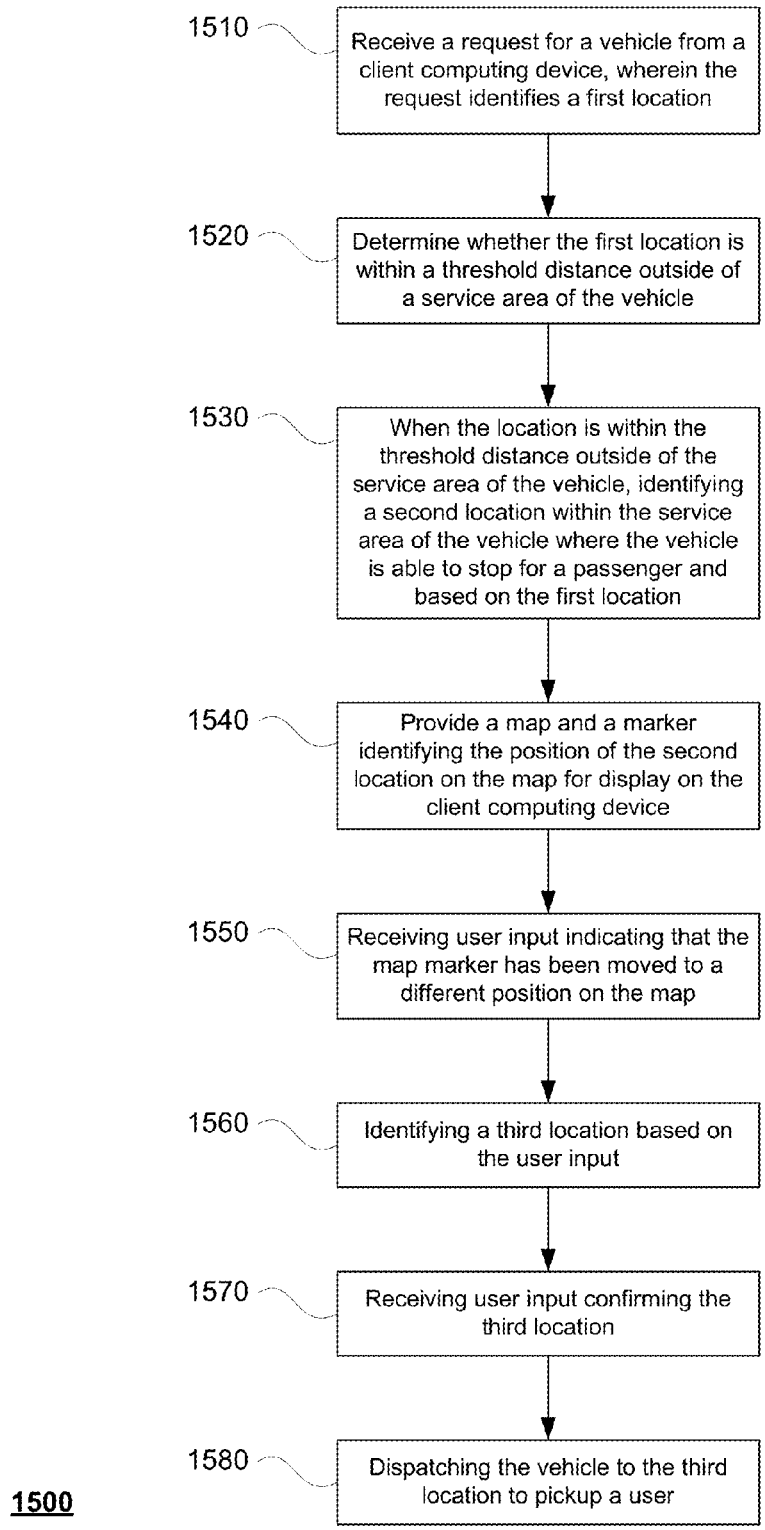
FIG. 15 is another example flow diagram in accordance with aspects of the disclosure.

FIG. 15 is an example flow diagram 1500 in accordance with some of the aspects described above that may be performed by one or more computing devices such as server computing devices 110. In this example, a request for a vehicle is received from a client computing device at block 1510. This request identifies a first location. Whether the first location is within a threshold distance outside of a service area of the vehicle is determined at block 1520. When the location is within the threshold distance outside of the service area of the vehicle, a second location within the service area of the vehicle where the vehicle is able to stop for a passenger and based on the revised pickup location is identified at block 1530. A map and a marker identifying the position of the second location on the map are provided for display on the client computing device at block 1540. User input indicating that the map marker has been moved to a different position on the map is received at block 1550. This user input is used to identify a third location at block 1560. User input confirming the third location is received at block 1570. The vehicle is then dispatched to the third location to pick up a user at block 1580.

As with the example of flow diagram 1400, the first location, second locations, and third locations of flow diagram 1500 correspond to pickup locations. However, if these locations were to refer to destination locations, rather than being dispatched to the second location to pickup a user at block 1580, the third location may be provided to the vehicle as a destination location for the user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more vehicle dispatching server computing devices from one or more computing devices, information identifying that a user has requested a vehicle in conjunction with a calendar entry in a calendar of the user;
   receiving, by the one or more vehicle dispatching server computing devices, information identifying a location associated with the calendar entry;
   providing, to a client computing device associated with the user, information identifying a pickup location for the user;
   receiving, by the one or more vehicle dispatching server computing devices, confirmation of the pickup location;
   in response to receiving the confirmation, dispatching, by one or more vehicle dispatching server computing devices, a vehicle to pick up the user; and
   providing, by the one or more vehicle dispatching server computing devices, the pickup location to the dispatched vehicle.

2. The method of claim 1, wherein the one or more computing devices include the client computing device associated with the user.

3. The method of claim 1, wherein the one or more computing devices includes an email server system.

4. The method of claim 1, wherein the pickup location corresponds to the location.

5. The method of claim 1, wherein the pickup location is the location associated with the calendar entry and the method further comprises, prior to providing the pickup location for the user, confirming that the location associated with the calendar entry is within a service area for the dispatched vehicle.

6. The method of claim 1, further comprising, in conjunction with providing the pickup location for the user, providing to the client computing an image of the pickup location and a map that includes the pickup location for display to the user.

7. The method of claim 6, wherein the confirmation of the pickup location is received in response to providing the image and the map.

8. A system comprising one or more vehicle dispatching server computing devices each having one or more processors configured to:
   receive from one or more computing devices, information identifying that a user has requested a vehicle in conjunction with a calendar entry in a calendar of the user;
   receive information identifying a location associated with the calendar entry;
   provide, to a client computing device associated with the user, information identifying a pickup location for the user;
   receive confirmation of the pickup location;
   in response to receiving the confirmation, dispatch a vehicle to pick up the user; and
   provide the pickup location to the dispatched vehicle.

9. The system of claim 8, wherein the one or more computing devices include the client computing device associated with the user.

10. The system of claim 8, wherein the one or more computing devices includes an email server system.

11. The system of claim 8, wherein the pickup location corresponds to the location.

12. The system of claim 8, further comprising the dispatched vehicle.

13. The system of claim 8, wherein the pickup location is the location associated with the calendar entry and the method further comprises, prior to providing the pickup location for the user, confirming that the location associated with the calendar entry is within a service area for the dispatched vehicle.

14. The method of claim 8, further comprising, in conjunction with providing the pickup location for the user, providing to the client computing an image of the pickup location and a map that includes the pickup location for display to the user.

15. The method of claim 14, wherein the confirmation of the pickup location is received in response to providing the image and the map.

16. A non-transitory, computer readable recording medium on which instructions are stored, the instructions, when performed by one or more processors of one or more vehicle dispatching server computing devices, cause the one or more processors to perform a method, the method comprising:
   receiving from one or more computing devices, information identifying that a user has requested a vehicle in conjunction with a calendar entry in a calendar of the user;
   receiving information identifying a location associated with the calendar entry;
   providing, to a client computing device associated with the user, information identifying a pickup location for the user;
   receiving confirmation of the pickup location;
   in response to receiving the confirmation, dispatching a vehicle to pick up the user; and
   providing a pickup location to the dispatched vehicle.

17. The non-transitory computer readable medium of claim 16, wherein the one or more computing devices include the client computing device associated with the user.

18. The non-transitory computer readable medium of claim 16, wherein the one or more computing devices includes an email server system.

19. The non-transitory computer readable medium of claim 16, wherein the pickup location corresponds to the location.

20. The non-transitory computer readable medium of claim 16, wherein the pickup location is the location associated with the calendar entry and the method further comprises, prior to providing the pickup location for the user, confirming that the location associated with the calendar entry is within a service area for the dispatched vehicle.

\* \* \* \* \*